United States Patent [19]
Bruning et al.

[11] 3,762,821
[45] Oct. 2, 1973

[54] LENS ASSEMBLY

[75] Inventors: John Henry Bruning, Millburn; Donald Richard Herriott, Morris City, both of N.J.

[73] Assignee: Bell Telephone Laboratories, Incorporated, Murray Hill, Berkeley Heights, N.J.

[22] Filed: Jan. 25, 1971

[21] Appl. No.: 109,217

[52] U.S. Cl............. 356/152, 356/127, 356/167, 250/201, 250/224, 350/178
[51] Int. Cl............................................ B29d 11/00
[58] Field of Search................... 356/152, 153, 172, 356/127, 167, 108; 250/234, 224, 201; 350/178

[56] References Cited
UNITED STATES PATENTS

| | | | |
|---|---|---|---|
| 3,007,097 | 10/1961 | Shelley et al. | 250/224 |
| 3,466,728 | 9/1969 | Werner | 350/178 |
| 3,544,796 | 12/1970 | Baker | 356/152 |
| 3,470,377 | 9/1969 | Le Febre et al. | 356/172 |
| 3,554,653 | 1/1971 | Zielke et al. | 356/153 |

FOREIGN PATENTS OR APPLICATIONS

21,406   6/1961   Germany .......................... 356/127

OTHER PUBLICATIONS

Beyer, "Epival Interference Microscope," Jena Review, 4-1971, L71x00099

*Primary Examiner*—Benjamin A. Borchelt
*Assistant Examiner*—S. C. Buczinski
*Attorney*—W. L. Keefauver and Arthur J. Torsiglieri

[57] ABSTRACT

A method and apparatus are disclosed for assembling lenses using a computer-controlled autocollimator and lens manipulator. A lens element is first inserted into the manipulator and positioned at approximately the desired location. Light from the autocollimator is than directed onto one of the lens surfaces. Reflected light is returned through part of the autocollimator to a photodetector comprising a quadrant-type photodetector that detects errors in the centering of the lens surface and an additional photosensor that is used to determine the distance between said lens surface and a fixed reference. When a lens surface is improperly centered or spaced, the computer generates error correction signals that are fed to the lens manipulator to correct the centering or spacing of the lens surface. After the first surface of a lens is centered, the centering of its second surface is accomplished in a similar fashion. However, in this case the lens is manipulated so that the first surface also remains aligned while the second surface is being aligned. Succeeding lens elements are centered and spaced in similar fashion, and all the centered lens elements are secured together with cement.

13 Claims, 4 Drawing Figures

INVENTORS J. H. BRUNING
D. R. HERRIOTT

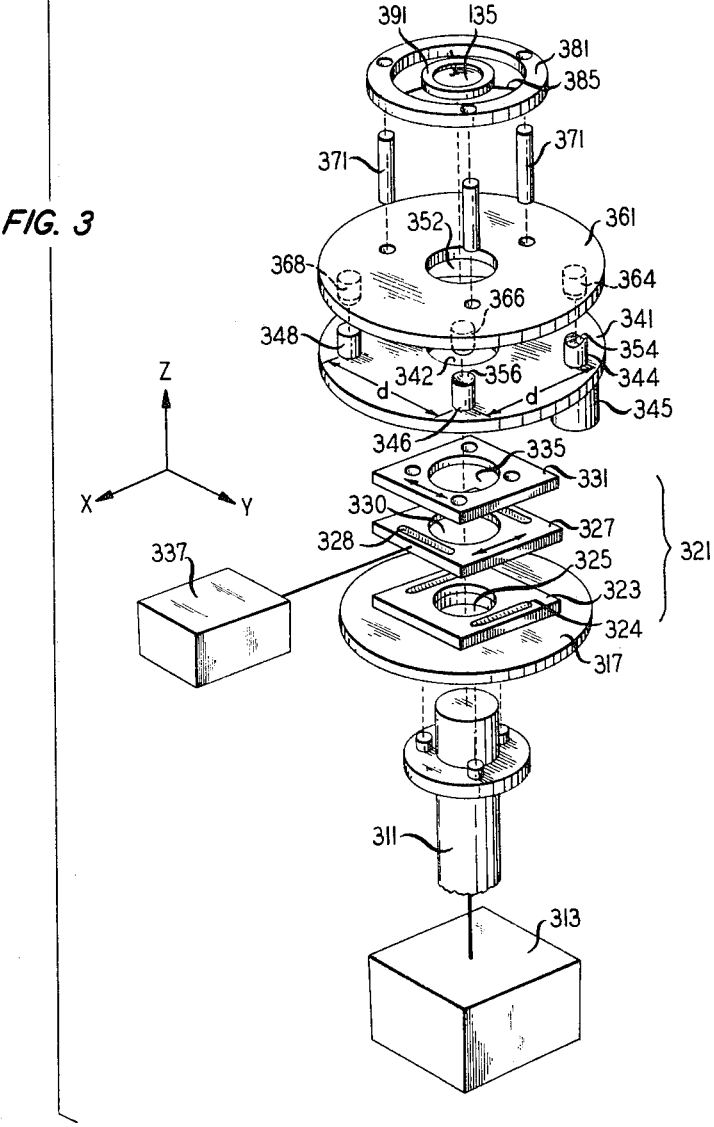

LENS ASSEMBLY

BACKGROUND OF THE INVENTION

This concerns lens assembling and in particular the centering and mounting of lens elements in proper relation with each other.

For optimum performance of a lens, each of the elements of the lens must be centered about the optical axis of the system and properly spaced from adjacent lens elements. In the past, numerous tenchiques have evolved for meeting these requirements. For example, in one such technique each lens element is centered by studying reflections from the two surfaces of the element as the element is rotated on a precision spindle. The position of the lens element on the spindle is changed until no motion is observed in two reflected images from the surfaces of the lens element. At this point, the optical axis of the lens element coincides with the axis of rotation of the spindle. In another centering technique, the lens element to be centered is inserted between two coaxial annular holders. These holders are then pushed toward each other causing the optical axis of the lens element to align itself with the axis of the holders. Once the optical axis is determined, the edge of the lens element is ground to conform to a surface of a cylinder having a central axis that is coincident with the optical axis of the element. This process is repeated for each lens element that is a part of the final lens. A barrel is then machined to hold each lens element precisely in place and the elements are then positioned in the proper place in the barrel. In another technique, each lens element is mounted in a brass ring and the outside edge of the brass ring, rather than the periphery of the lens, is machined to produce a cell having a central axis coincident with the optical axis of the lens element. Regardless of the particular technique used, errors inevitably arise because the tolerance on edging each lens element or brass ring must be added to the errors in determining the optical axis of each lens element. In the past, these errors have not been too significant because adequate quality lenses were nevertheless readily achieved. However, with the resolution requirements of present-day microphotography used, for example, in the fabrication of semiconductor large-scale integrated circuits, better lenses are needed than in the past.

SUMMARY OF THE INVENTION

Accordingly, it is an object of this invention to improve the assembly of lens elements.

At the same time as the desire for extremely high-quality lenses has manifested itself, the costs of producing any precision lens has been steadily increasing. Accordingly, it is still another object of this invention to reduce the expense of manufacturing precision lenses.

These and other objects of the invention are accomplished by assembling lenses with a computer-controlled autocollimator and lens manipulator. To assemble the lens, the first element is inserted into the manipulator and positioned so that it is approximately centered. Light from the autocollimator is then directed onto one of the surfaces of the lens element. Reflected light is returned through part of the autocollimator to a photodetector. This device comprises both a quadrant-type photodetector that detects any centering errors in the lens surface and an additional photosensor that is used to determine the axial location of said lens surface.

When a lens surface is improperly centered or spaced, the signals from the photodetector are processed by the computer to generate error correction signals that are fed to the lens manipulator to correct the centering or the spacing of a lens surface. After the first surface of a lens is centered, the centering of its second surface is accomplished in a similar fashion. However, as will be detailed below, the lens is manipulated so that the first surface remains aligned while the second surface is being aligned. Succeeding lens elements are centered and spaced in similar fashion and all the centered lens elements are secured together by cementing them to spacing rods or strips.

All the centering and spacing operations are controlled by a digital computer such as a PDP-8 manufactured by Digital Equipment Corporation. This makes possible very rapid assembly of lenses. Because the lens elements are spaced simply by cementing them to supports, variations in spacing between the lens elements can readily be used to accommodate lens elements having slightly different optical properties than those specified in the lens design. This facilitates the mass production of lenses because it enables one to correct for the small differences that inevitably are found among a large number of supposedly identical lens elements.

BRIEF DESCRIPTION OF THE DRAWING

These and other objects and features of the invention will become more readily apparent from the following detailed description of the invention taken in conjunction with the following drawing in which:

FIG. 3 is an exploded view of an illustrative embodiment of lens element manipulator 31 of FIG. 1.

DETAILED DESCRIPTION OF THE INVENTION

The Apparatus of the Invention

Figure 1:
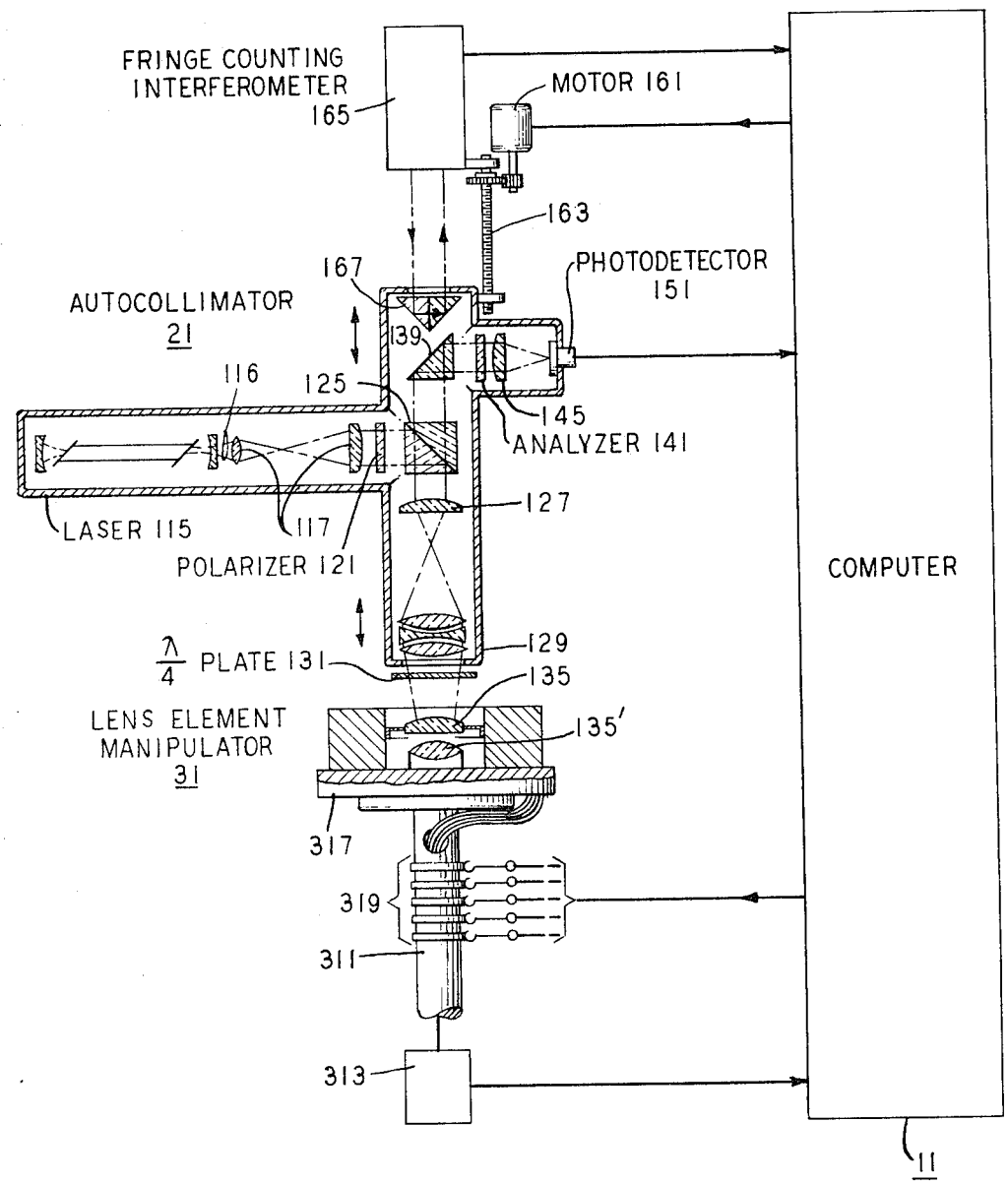
FIG. 1 is a schematic illustration of an illustrative embodiment of the invention.

An illustrative embodiment of the apparatus of our invention is schematically depicted in FIG. 1. This apparatus is essentially comprised of a digital computer 11, an autocollimator 21, a lens element manipulator 31, a fringe counting interferometer 165, and a shaft encoder 313. As indicated in FIG. 1 and detailed below, information from autocollimator 21, interferometer 165, and shaft encoder 313 is fed to computer 11. This computer then calculates from this information the changes that must be made in the position of the lens element being aligned. Appropriate signals are then generated and sent to manipulator 31 to effect such changes.

Autocollimator 21 comprises a laser 115 that forms a beam 116 of coherent radiation, a beam splitter 125 for directing the laser beam onto a lens element 135 that is to be centered, and a photodetector 151 for detecting centering errors in lens element 135 and for determining the axial location of said lens element. Lens element 135 may have two optical surfaces as shown or may be a mirror having only one reflecting surface. Considerable auxiliary apparatus is also shown in autocollimator 21. Polarizer 121, quarter-wave plate 131, and analyzer 141 are used to eliminate spurious reflections from the surfaces of the various optical elements in autocollimator 21. This use of a polarizer, a quarter-wave plate, and an analyzer is described in U. S. Pat. No. 2,318,705 and will not be discussed further. A beam expander 117 is used to expand the width of laser beam 116 to a diameter appropriate for use in this invention. Lenses 127 and 129 are used to modify the curvature of beam 116 in a known fashion to conform to the curvature of the surface of lens element 136 that is being aligned. Reflector 139 directs light that is reflected from object 135 toward photodetector 151. Lens 145 converges this light onto this photodetector.

Lens element 135 is mounted in lens element manipulator 31. This manipulator comprises a precision spindle 311 that can be rotated by appropriate means (not shown), a shaft encoder 313 that continuously monitors the position of spindle 311 and a plate 317 that is rigidly attached to spindle 311. On this plate are located several units for changing the orientation of lens 135. These units are controlled by a set of leads from computer 11 that are connected through a set of slip rings 319 on spindle 311. Extension discussion of these units is given below in conjunction with FIG. 3.

Autocollimator 21 can be moved along the axis of rotation of spindle 311. This movement is accomplished by a motor 161 that drives a lead screw 163 attached to autocollimator 21. The precise position of autocollimator 21 at any moment is determined by a conventional fringe counting interferometer 165 that directs a beam of light to a corner reflector 167 on autocollimator 21. Illustratively, interferometer 165 is a Perkin-Elmer Lasergage Model 5,900.

Figure 2:
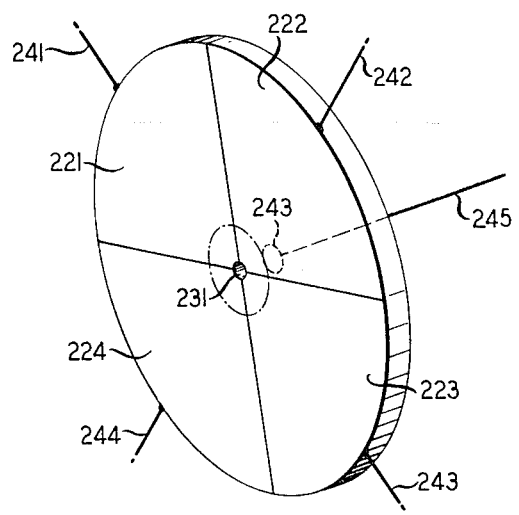
FIG. 2 is a schematic illustration of an illustrative embodiment of photodetector 151 of FIG. 1.

An illustrative embodiment of photodetector 151 is shown in detail in FIG. 2. It comprises a quadrant-type photodetector 211 in the center of which there is a minute aperture 231 approximately the size of the diffraction spot formed by lens 145. Under certain circumstances described below, this aperture permits some incident light to reach another photodetector 235 located behind the aperture. Each of the four quadrants 221, 222, 223, and 224 of the detector is a separate photodetector. Leads 241, 242, 243, and 244 from these quadrants conduct a signal proportional to the amount of light incident on the particular quadrant. A fifth lead 245 from photodetector 235 carries a signal proportional to the amount of light incident on that photodetector. As will be detailed below, the quadrant photodetector is used in a conventional way known to those skilled in the art to detect centering errors in the position of lens 135. Photodetector 235 is used to determine the axial location of the surface of lens element 135 that is being studied.

An illustrative embodiment of lens element manipulator 31 is shown in FIG. 3. This apparatus comprises the aforementioned precision spindle 311, shaft encoder 313, plate 317, and slip rings 319. It also comprises a roller-bearing slide 321, a second rigid plate 341, a third rigid plate 361, and an annular bracket 381. Roller-bearing slide 321 comprises three parallel plates 323, 327 and 331, mounted one on top of the other with roller bearings in between. The roller bearings between plates 323 and 327 are confined to two parallel races 324 running in one direction; and those between plates 327 and 331 are confined to two parallel races 328 running in the orthogonal direction. In the middle of each of these plates are apertures 325, 330, and 335 that fit around the shaft of precision spindle 311. With the exception of the apertures in the plates, slide 321 is similar to conventional translation stages sold, for example, as Models 20.127, 20.128, and 20.129 bu Lansing Research Corporation, Ithaca, N. Y.

Plate 323 is mounted rigidly on plate 317. Aperture 325 therefore need only be large enough to accommodate the shaft of spindle 311. Apertures 330 and 335 in plates 327 and 331 respectively have diameters considerably larger than that of the shaft in order to permit motion of plates 327 and 331. Plate 327 is moved in the X direction as shown in FIG. 3, by a rotary stepper motor that drives a differential screw in contact with the plate. The differential screw is similar to such screws sold as Models 22.501 and 22.505 by Lansing Research Corporation. The combination of the rotary stepper motor and differential screw serves as a linear actuator represented schematically in FIG. 3 as actuator 337. Plate 331 is moved in the Y direction by a similar stepper motor and differential screw that are not shown. Roller-bearing races 324 and 328 constrain plates 327 and 331 so that their motions are only in the directions indicated.

Plate 341 is rigidly secured to plate 331 and has an aperture 342 that is similar in size to aperture 335. As a result, X motion and Y motion in slide 321 is transferred to plate 341. Mounted in plate 341 are three posts 344, 346, and 348. Each of these posts can be independently moved in the Z-direction by a linear actuator similar to those used in controlling the X and Y positions of plates 327 and 331. One such linear actuator 345 is schematically shown in FIG. 3 in position to change the height of post 344. Similar linear actuators that are not shown are used to adjust the heights of posts 346 and 348.

As shown in FIG. 3, the tip of post 344 has a V-shaped slot 354 and the tip of post 346 is a conical depression 356. The valley of the V-shaped slot is in line with the center of the conical depression. The tip of post 348 is flat. The tips of posts 344, 346, and 348 form the bases for the kinematic support of three ball-tipped feet 364, 366, and 368 extending down from plate 361 and resting respectively in the V-shaped slot of post 344, the conical depression of post 346, and the flat surface of post 348. Posts 344 and 346 are spaced apart a distance $d$, as measured from the centers of the posts, equal to the spacing between posts 346 and 348; and there is a 90° angle between the line connecting posts 344 and 346 and the line connecting posts 346 and 348. Similarly, the centers of the shafts of feet 364 and 366 are spaced apart a distance $d$ equal to the spacing between the centers of the shafts of feet 366 and 368; and there is a 90° angle between the axis connecting feet 364 and 366 and the axis connecting feet 366 and 368. As a result of this arrangement, plates 341 and 361 constitute a kinematic mount. Further details on such mounts may be found in pages 427–431 of W. J. Smith's *Modern Optical Engineering* (McGraw-Hill 1966). Such a mount provides the minimum number of constraints necessary to locate an object, such as plate 361, in a unique position with respect to a second object, such as plate 341. By altering the heights of posts 344, 346, and 348, several motions can be transferred to plate 361. For example, motion in the Z direction can be implemented by moving posts 344, 346, and 348 equal amounts in the vertical direction. Rotation about the axis between posts 344 and 346 can be effected by moving post 348; and rotation about the axis between posts 346 and 348 can be effected by moving post 344.

Motion of plate 361 is transferred to lens element 135 through a set of stachions 371 that secure bracket 381 to plate 361. The height of bracket 381 above plate 361 can be adjusted by sliding bracket 381 on stachions 371. Conventional means (not shown) are used to hold bracket 381 at the desired position on stanchions 371. Three supports 385 secure lens element 135 to bracket 381.

Because of the mechanical linkages just described, it is possible to use five linear actuators to move lens element 135 in any one or more of three orthogonal directions as well as tilt it about any axis transverse to the axis of rotation of spindle 311. Thus, the linear actuators control the five degrees of freedom of lens element 135. As will be shown below, this control of the five degrees of freedom is enough to make it possible to move a surface of a lens element about any point on the axis of rotation of spindle 311. In particular, because the center of curvature of a properly centered surface of a lens element lies on the axis of rotation of the spindle, the centered surface of the lens element can be rotated abouts its center of curvature. As is well known in the art, rotation of a centered surface about its center of curvature maintains the centering of the surface because the surface is spherical. Consequently, after one surface of a lens element is centered on the optical axis of the lens element, the other surface can be centered by moving the lens element about the radius of curvature of the centered surface. This ability of our apparatus to center each surface of the lens element without affecting the centering of the other surface may be summarized by a description of our apparatus as independently centering the two surfaces of the lens element.

The Operation of the Invention

Before operating the invention, it is necessary to align the apparatus. Specifically, it is necessary to determine the location of the centers of the three ball-tipped feet 364, 366 and 368 with respect to a reference surface (not shown) and the axis of rotation of spindle 311. These locations are determined by conventional means. It is also necessary to match the curvature of the wavefront from the autocollimator to the curvature of the surface that is to be centered. We align the upper surface of lens element 135 first. Accordingly, autocollimator 21 is moved along the axis of rotation of spindle 311 to the position where the curvature of the beam from the autocollimator approximately matches the curvature of the surface of lens element 135 that is closer to the autocollimator. In some cases, it may not be possible to match the curvatures with the particular lens 129 in the autocollimator. In these cases, lens 129 is changed to a lens of the appropriate power.

The first lens element to be centered is then inserted into the apparatus by securing to supports 385 the annular ring 391 to which lens element 135 is cemented. A beam of coherent radiation from laser 115 is then directed toward beam splitter 125. There it is reflected through lenses 127 and 129 to lens element 135. Light incident on the upper surface of element 135 is reflected from this surface back through lenses 129 and 127 to beam splitter 125. This light continues through beam splitter 125 to reflector 139 that redirects the light through converging lens 145 onto photodetector 151. If the optical system in autocollimator 11 is perfectly aligned and if the upper surface of lens 135 is properly centered, then the light incident on photodetector 211 is incident in equal amounts on each of the quadrants 221, 222, 223 and 224. In this case, the signals on leads 241, 242, 243 and 244 will be the same. Ordinarily, however, the light incident on photodetector 211 will be incident in unequal amounts on the four quadrants. As a result, different signals will be present on the four leads from these quadrants. These signals are representative of either a misalignment in the optics of the autocollimator or a decentering of the upper surface of lens element 135.

To eliminate the effects of any misalignments in autocollimator 21, lens element 135 is rotated by rotating spindle 311. If the center of curvature of the upper surface of element 135 is on the axis of rotation of spindle 311, there will be no change in the light pattern incident on quadrant photodetector 211; and the upper surface will be properly centered. On the other hand, if the surface is decentered, then the light pattern incident on photodetector 211 will rotate as spindle 311 rotates Accordingly, by analyzing the signals on leads 241 through 244 following conventional methods known in the art, it can be ascertained whether the surface of lens 135 is properly centered. Moreover, again following well-known methods, the displacement of the center of curvature of the upper surface of lens element 135 from the axis of rotation of spindle 311 can be determined. In the coordinate system used in FIG. 3, this displacement is a displacement in the X-Y plane. The determination of the displacement is made in our apparatus by a straightforward program in computer 11 using as inputs the information on leads 241 through 244, the thickness of lens element 135, the radii of curvature of its two surfaces and the location of the axis of rotation of spindle 311.

It would be possible to center the upper surface of lens element 135 simply by translating element 135 in the X and Y directions enough to locate the center of curvature of the upper surface of lens element 135 on the axis of rotation of spindle 311. We prefer, however, to rotate element 135 about a point on the axis of rotation of spindle 311 that will be the center of curvature of the lower surface of element 135 once this lower surface is centered.

To center the upper surface of lens element 135 by rotating the lens element about the center of curvature of the lower surface, it is necessary to solve seven simultaneous equations describing the positions of the centers of the three ball-tipped feet 364, 366 and 368. Because these feet are mechanically linked to the position of lens element 135, the solution of equations describing their location also describes the location of lens element 135. Before the centering operation begins, ball-tipped foot 366 is at position $x_1$, $y_1$, $z_1$; foot 364 is at position $x_2$, $y_2$, $z_2$; and foot 368 is at position $x_3$, $y_3$, $z_3$ where $x$, $y$, and $z$ are measured in a coordinate system having its center where the center of curvature of the lower surface of lens element 135 will be located once this surface is centered. For this convention, the relations between the three centers of the ball-tipped feet are given by the equations $$(x_2 - x_1)^2 + (z_2 - z_1)^2 = d^2 \qquad (1)$$

$$(y_3 - y_1)^2 + (z_3 - z_1)^2 = d^2 \qquad (2)$$

$$(x_2 - x_3)^2 + (y_2 - y_3)^2 + (z_2 - z_3)^2 = 2d^2 \quad (3)$$

$$x_1^2 + y_1^2 + z_1^2 = r_1^2 \quad (4)$$

$$x_2^2 + y_2^2 + z_2^2 = r_2^2 \quad (5)$$

$$x_3^2 + y_3^2 + z_3^2 = r_3^2 \quad (6)$$

$$y_2 = y_1 \quad (7)$$

Equations 1 through 3 and 7 arise from straightforward mechanical spacing considerations where $d$ is the distance defined above between the centers of the shafts of feet 364 and 366. Equations 4 thorugh 6 arise from the definition of the coordinate system. Each of these equations will be recognized as defining a sphere of radius $r_1$, $r_2$ or $r_3$ centered at the center of the coordinate system. Consequently, the center of each ball-tipped foot can be described as lying on the surface of a sphere that is centered on the spindle axis at the center of curvature of the lower surface of lens element 135. Because the location of this center of curvature and the locations of the centers of the ball-tipped feet are all known, $r_1$, $r_2$, and $r_3$ can readily be calculated.

To move lens element about the approximate center of curvature of its lower surface, it is only necessary to move the element so that each of the ball-tipped feet remains the same distance away from the center of curvature of the lower surface of element 135. In other words, after the lens element is moved, $r_1$, $r_2$ and $r_3$ should be the same as they were before the lens element was moved. To accomplish this, plates 327 and 331 are moved by their linear actuators in the X and Y directions, a fraction of the distance neded to move the center of curvature of the upper surface of lens element 135 to the axis of rotation of spindle 311. This establishes new values for $x_1$ and $y_1$ in equation (4) above. A new value of $z_1$ is then calculated by the computer from equation (4) where $$z_1^2 = r_1^2 - x_1^2 - y_1^2 \quad (8)$$

Next, a value of $z_2$ is calculated from the relation
$$z_2^2 = -1/2 2w^2 \; [z_1(d^2 - 2w^2 - e^2) \pm x_1 d(4w^2 + 2e^2 - d^2 - e^4/d^2)^{1/2}] \quad (9)$$

where
$$w^2 = x_1^2 + y_1^2$$
$$e_1^2 = r_2^2 - r_1^2$$

using in the term beginning $\pm x_1 d$ the minus sign if $z_1$ is greater than zero and the plus sign if $z_1$ is less than zero. Equation (9) is derived from equations (1), (4), (5), and (7). Finally, a new value of $z_3$ is calculated. This calculation is best made by an interative procedure following Newton-Raphson techniques. To make this calculation it is also necessary to determine simultaneously the X position of ball-tipped foot 368. This is also done by interative procedures. The general iterative relations for calculating new values $x'_3$ and $z'_3$ of the coordinates of ball-tipped foot 368 are:

$$x'_3 \approx x_3 + [(A \cdot C - B \cdot D)/(E \cdot D - C \cdot F)] \quad (10)$$

$$z'_3 \approx z_3 + [(B \cdot F - A \cdot E)/(E \cdot D - C \cdot F)] \quad (11)$$

where
$$A = (z_3 - z_1)^2 + (y_3 - y_1)^2 - d^2$$
$$B = (z_3 - z_1)^2 - (z_2 - z_3)^2 - (x_2 - x_3)^2 + d^2$$
$$C = 2(z_2 - z_1)$$
$$D = -2(y_3 z_1 - Y_1 z_3)/y_3$$
$$E = 2(x_2 - x_3)$$
$$F = -2x_3(Y_3 - Y_1)/Y_3$$

These equations are derived from equations (2), (3), (6), and (7) and the values for $z_1$ and $z_2$ given in equations (8) and (9). Iterations of equations 10 and 11 converge rapidly. Consequently, if the new value of $z_3$ is close to the old value, only a few iterations are needed to calculate it.

After the new values $x_1$, $y_1$, $z_1$, $z_2$ and $z_3$ are determined, the computer calculates the changes that are to be made in the positions of plates 327 and 331 and posts 344, 346, and 348. It then generates signals necessary to implement these changes; and these signals are then sent over the appropriate leads through slip rings 319 on spindle 311 to the various linear actuators that position the plates and posts.

After the plates and posts are moved to the new positions, the centering of the upper surface of lens element 135 is again checked. If this surface is found to be centered, the centering of the lower surface can then begin. If, however, the upper surface is not centered, then the displacement of the center of curvature of the upper surface from the axis of rotation is again measured by quadrant photodetector 211; and another rotation is made of the lower surface of lens element 135 about its center of curvature. This rotation follows exactly the same procedure described above. Plates 327 and 331 are moved by their linear actuators in the X and Y directions a fraction of the distance needed to move the center of curvature of the upper surface of lens element 135 to the axis of rotation of spindle 311. From the new values thus established for $x_1$ and $y_1$, a new value of $z_1$ is calculated according to equation (8). A value of $z_2$ is then calculated using equation (9) and a value of $z_3$ is calculated using equations (10) and (11). The computer generates a signal that changes the positions of the centers of the ball-tipped feet 364, 366 and 368 to these new values. The centering of the upper surface of lens element 135 is then checked and this process is repeated until centering is finally achieved.

Once the upper surface is centered, its center of curvature lies on the axis of rotation of spindle 311. The precise location of this point can readily be determined with the computer by moving autocollimator 21 along the axis of rotation of spindle 311 and monitoring the output of interferometer 165 and photodetector 235. When the beam of radiation from autocollimator 21 is focused to a point on the upper surface of lens element 135, the beam that is incident on photodetector 151 will likewise be converged to a point limited only by the size of the diffracted spot formed by lens 145. Because the top surface of lens 135 is centered, this point will be coincident with aperture 231 in the center of quadrant photodetector 211. Thus, substantially all the light reflected from the upper surface of lens element 135 will pass through aperture 231 in quadrant photodetector 211 and be incident on photodetector 235. The greatest amount of light will pass through aperture 231 when the beam of radiation is focused onto the upper surface of element 135. When the beam of light is focused to any other point, less light will be incident on photodetector 235. Hence, to determine the precise location of lens element 135, the computer activates motor 161 to move autocollimator 21 along the axis of rotation of spindle 311. Simultaneously, it also monitors the output of lead 245 from photodetector 235 and the position of autocollimator 21 as determined by interferometer 165. From this information, the computer determines by curve fitting the point at which autocollimator 21 is focused on the upper surface of lens element 135. Because the computer has stored in its memory the location of the reference surface used in determining the centers of the three ball-tipped feet, the difference between the interferometer reading when autocollimator 21 is focused on the upper surface of lens element 135 and the interferometer reading when autocollimator 21 is focused on the reference surface yields the precise position of lens element 135. The center of curvature of the top surface of lens element 135 is then known because the radius of curvature of this surface is known.

Centering of the lower surface of lens element 135 then takes place following the same procedure detailed for centering the upper surface. Again the curvature of the wavefront from the autocollimator is matched to the curvature of the lens surface to be centered by adjusting the position of the autocollimator or, if necessary, changing lens 129. Note, however, that in this case it is the curvature of the wavefront in the lens that is matched to the curvature of the lower surface. The distances $r_1$, $r_2$ and $r_3$ between the ball-tipped feet and the center of curvature of the upper surface of lens element 135 are calculated. The decentering of the lower surface is then measured by quadrant photodetector 211. The lens element is then rotated about the center of curvature of the upper surface of the lens. To accomplish this rotation, plates 327 and 331 are moved in the X and Y directions a fraction of the distance needed to move the center of curvature of the lower surface of lens element 135 to the axis of rotation of spindle 311. This establishes new values for the $z_1$ and $y_1$ coordinates of the center of ball-tipped foot 356. From these values and the value for $r_1$, a new value for $z_1$ is calculated according to equation (8) above. From equations (9), (10), and (11), values are also calculated for $z_2$ and $z_3$. The changes that have to be made in the positions of plates 327 and 331 and posts 344, 346, and 348 are then calculated and appropriate signals to effect these changes are fed to the various linear actuators that control the locations of these plates and posts.

The centering of the lower surface of the lens is then rechecked. If the lens is still found to be decentered, the amount of decentering is determined and further rotation of the lens element about the center of curvature of its upper surface is made. This process continues until the lower surface is also centered.

Once the lower surface is centered, the centers of curvature of the upper and lower surfaces of lens element 135 lie on the axis of rotation of the spindle. The element is then cemented to the top of spindle 311. One such element, 135' is shown in FIG. 1 in such a position.

After the first element is centered, the second element in the lens is inserted into lens manipulator 31 by securing to supports 385 the annular ring to which the lens element is cemented. This element is positioned near the optical axis of autocollimator 21 so that light reflected from its surface is incident on photodetector 151. Bracket 381 is slid on stanchions 371 so that the second lens element is spaced approximately the desired distance from the previously centered lens element. The top surface of the second lens element is then aligned following exactly the same procedure detailed above for aligning the top surface of the first lens element. After the top surface is aligned, the location of the top surface is determined as above with the aid of photodetector 151 in auto-collimator 21 and fringe counting interferomater 165. The second lens element is then repositioned along the axis of rotation of spindle 311 so that its top surface is located at the desired distance from the top surface of the first lens element. This repositioning is accomplished by incrementing each of the linear actuators that position posts 364, 366, and 368 by the same amount. The lower surface of the second lens element is then centered following exactly the same procedure detailed above for centering the lower surface of the first lens element.

When the second lens element is centered, it is cemented to the first lens element. This is preferably done using spacer rods that contact the annular metal ring to which the lens element is cemented. In a similar fashion, the remaining lens elements in the lens are centered and cemented together in their proper position.

Figure 4:
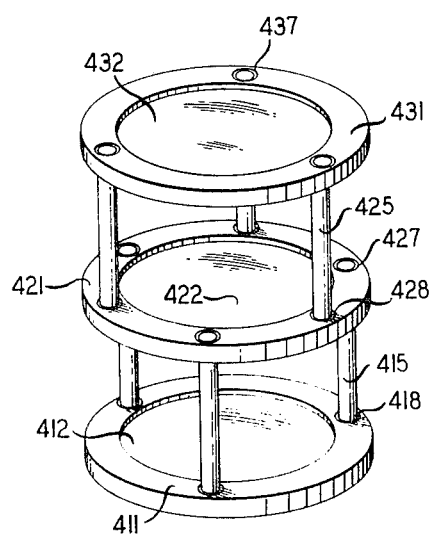
FIG. 4 is a representation of a lens assembled according to our invention.

An illustrative embodiment of a three-element lens 410 is depicted in FIG. 4. Lens 410 comprises three lens elements 412, 422, and 432. These elements are cemented into metal rings 411, 421, and 431, respectively. These rings are spaced apart the desired distance by spacer rods 415 and 425. Rods 415 are cemented into depressions 418 in ring 411 and holes 427 in ring 421. Rods 425 are cemented into depressions 428 in ring 421 and holes 437 in ring 431. The inside diameters of the various depressions and holes should be larger than the outside diameter of the rods in order to accommodate changes in the position of the rings that are required by the centering operation.

Alternatively, the various lens elements may be held in position by metal strips that are cemented to the outer diameter of the annular ring surrounding each lens element.

As will be obvious to those skilled in the art numerous modifications may be made in the apparatus described above. The autocollimator that is used is only one of many available; and the means for locating the position of the autocollimator 21, spindle 311 and the lens element 135 being centered are only illustrative. Any number of devices may be used in place of the micrometers and stepper motors we have described. For example, combinations of lead screws and piezoelectric transducers can also be used as linear actuators. Similarly, many modifications may be made in photodetector 151 to achieve the same results. For example, the quadrant photodetector may be implemented by silvering the sides of a four-sided glass pyramid. This pyramid is then located in the apparatus so that each of these four sides directs incident light to a photodetector. By removing the silver from the tip of the pyramid, a small aperture is formed in the pyramid that is comparable to aperture 231 in FIG. 2. Behind this aperture can be located a photodetector that is the equivalent of photodetector 235 of FIG. 2.

The use of the five linear actuators and the plates and posts they drive is only illustrative. Many other ways for achieving motion in the X, Y, and Z directions as well as tilts about axes transverse to the axis of rotation of spindle 311 will be apparent to those skilled in the art. For instance, the posts can be arranged at the three corners of an equilateral triangle instead of at three of the four corners of a square as shown in FIG. 3.

Numerous other modifications within the spirit and scope of our invention will be apparent to those skilled in the art.

What is claimed is:

1. Lens assembly apparatus for centering a lens element having two surfaces so that the optical axis of the lens element is aligned along a predetermined axis comprising:

means for directing a beam of electromagnetic radiation at the lens element to be centered;

means for mounting the lens element on said predetermined axis;

means for receiving radiation from said lens element and for generating signals indicative of the amount that a surface of the lens element is decentered; and means for sequentially adjusting the position of one surface of the lens element and then the other surface of the lens element to correct the decentering that is detected, said adjusting means comprising means for aligning one surface of the lens element without substantially changing the center of curvature of the other surface such that one surface of the lens element can be aligned independently of the position of the other surface lens element.

2. The apparatus of claim 1 further characterized in that the adjusting means comprises at least five linear actuators that alone or in combination move the lens element in three orthogonal directions and tilt it about axes orthogonal to said predetermined axis.

3. The apparatus of claim 2 further characterized in that the five linear actuators are controlled by a computer that receives the radiation from the lens element and generates the signals indicative of the amount that the surface of the lens element is decentered.

4. The apparatus of claim 1 further characterized in that the means for mounting the lens element on said predetermined axis comprises a kinematic mount.

5. The apparatus of claim 4 wherein the kinematic mount comprises three supports and said apparatus is further characterized by means for moving said kinematic mount in a plane transverse to said predetermined axis and means for moving each of said three supports independently.

6. The apparatus of claim 5 further characterized in that said means for moving the kinematic mount and said means for moving each of its supports are controlled by a digital computer.

7. The apparatus of claim 1 further characterized by means for locating the position of the lens element comprising:

means for moving the beam directing means along said predetermined axis so that the focus of the beam is moved through a surface of the lens element;

means for monitoring the position of the moving beam directing means; and means for detecting the radiation from said surface of the lens element.

8. The apparatus of claim 1 further characterized in that the means for receiving radiation transmitted from said lens element comprises a quadrant-type photodetector in the center of which is an aperture and an additional photodetector located behind the aperture.

9. The apparatus of claim 8 wherein a lens focuses radiation to a spot on the quadrant photodetector and the aperture in the photodetector has a diameter on the order of the diffraction spot size of said lens.

10. A method for centering two surfaces of a lens element so that the optical axis of the lens element is aligned along a predetermined axis comprising the steps of:

mounting the lens element on said predetermined axis;

directing a beam of electromagnetic radiation at the lens element;

receiving radiation from said lens element and generating signals indicative of the amount that a surface of the lens element is decentered; and sequentially adjusting one surface of the lens element and then the other surface of the lens element to correct the decentering that is detected, said adjusting step comprising the step of aligning one surface of the lens element without substantially changing the center of curvature of the other surface of the lens element such that one surface of the lens can be aligned independently of the position of the other surface lens element.

11. The method of claim 10 further comprising the steps of centering a series of lens elements by the same procedure and characterized by the step of cementing the lens elements to spacing means after they are centered.

12. The method of claim 10 further comprising the steps of centering by the same procedure a series of lens elements mounted in annular rings and characterized by the step of cementing the annular rings to spacing means after the lens elements are centered.

13. A method for centering a lens element so that the optical axis of the lens element is aligned along a predetermined axis comprising the steps of:

mounting the lens element on said predetermined axis;

directing a beam of electromagnetic radiation at the lens element;

receiving radiation from said lens element and generating signals indicative of the amount that a surface of the lens element is decentered; and sequentially adjusting one surface of the lens element and then the other surface of the lens element to correct the decentering that is detected, said adjusting means comprising means for aligning one surface of the lens element without substantially changing the center of curvature of the other surface of the lens element such that one surface of the lens element can be aligned independently of the position of the other surface lens element, and the adjusting of the lens element is controlled by a digital computer.

* * * * *